US011859795B2

(12) United States Patent
Leacox et al.

(10) Patent No.: US 11,859,795 B2
(45) Date of Patent: Jan. 2, 2024

(54) SURFACE MAINTENANCE MACHINE LIGHT PROJECTION

(71) Applicant: Tennant Company, Eden Prairie, MN (US)

(72) Inventors: Grant Daniel Leacox, Minneapolis, MN (US); Richard Alan Loveless, St. Louis Park, MN (US)

(73) Assignee: TENNANT COMPANY, Eden Prairie, MN (US)

( * ) Notice: Subject to any disclaimer, the term of this patent is extended or adjusted under 35 U.S.C. 154(b) by 0 days.

(21) Appl. No.: 17/592,910

(22) Filed: Feb. 4, 2022

(65) Prior Publication Data

US 2023/0250938 A1 Aug. 10, 2023

(51) Int. Cl.

| | |
|---|---|
| ***F21V 14/06*** | (2006.01) |
| ***F21V 5/00*** | (2018.01) |
| ***A47L 11/40*** | (2006.01) |
| *F21Y 115/10* | (2016.01) |

(52) U.S. Cl.

CPC ........... *F21V 14/06* (2013.01); *A47L 11/4008* (2013.01); *A47L 11/4011* (2013.01); *F21V 5/00* (2013.01); *F21Y 2115/10* (2016.08)

(58) Field of Classification Search

CPC .............. G05D 1/0234; A47L 11/4008; B60Q 2400/50; B60Q 1/2611; B60Q 1/482; B60Q 1/50; B60Q 1/507; B60Q 1/543; G08B 5/36

See application file for complete search history.

(56) References Cited

U.S. PATENT DOCUMENTS

| | | | | |
|---|---|---|---|---|
| 4,733,430 A | 3/1988 | Westergren | | |
| 6,580,368 B1 * | 6/2003 | Jacobs | B60Q 1/482 | 116/28 R |
| 8,381,982 B2 * | 2/2013 | Kunzig | G05D 1/0234 | 235/462.08 |

(Continued)

FOREIGN PATENT DOCUMENTS

| | | |
|---|---|---|
| DE | 102017125079 A1 | 5/2019 |
| EP | 3290567 A1 | 3/2018 |

(Continued)

OTHER PUBLICATIONS

International Patent Application No. PCT/US2023/061898, Invitation to Pay Additional Fees and Partial Search Report dated May 31, 2023, 13 pages.

*Primary Examiner* — Tracie Y Green
*Assistant Examiner* — Michael Chiang
(74) *Attorney, Agent, or Firm* — Fredrikson & Byron, P.A.

(57) ABSTRACT

A surface maintenance machine includes a body, a surface maintenance tool coupled to the body, processing circuitry supported at the body, and a light projection mechanism supported at the body and coupled to the processing circuitry. The light projection mechanism includes a light housing, a light emitting element within the light housing, and a projection lens that is configured to focus light emanating from the light emitting element. The light projection mechanism is configured to project light onto a ceiling surface that is above a floor surface along which the surface maintenance machine is configured to perform a surface maintenance task using the surface maintenance tool.

20 Claims, 8 Drawing Sheets

(56) References Cited

U.S. PATENT DOCUMENTS 8,632,376 B2 * 1/2014 Dooley ................. A63F 13/803
901/6
8,634,848 B1 * 1/2014 Bozarth ................ G01S 5/0284
455/456.1
9,310,806 B2 * 4/2016 Romanov ................. G01S 5/16
10,906,573 B2 2/2021 Chung et al.
11,036,236 B2 6/2021 Janssen et al.
2006/0092643 A1 * 5/2006 Wong ...................... F21V 5/048
362/328
2006/0287801 A1 12/2006 Im
2007/0171040 A1 * 7/2007 Li .......................... B60Q 1/482
340/471
2008/0178916 A1 7/2008 Kedjierski
2015/0042485 A1 * 2/2015 Suessemilch ............ G08B 5/36
340/815.4
2016/0313636 A1 * 10/2016 Chien ..................... F21V 21/08
2017/0049288 A1 2/2017 Knutson et al.
2018/0050634 A1 2/2018 White et al.
2018/0065541 A1 * 3/2018 Augusty .................. G08B 5/36
2019/0325713 A1 * 10/2019 Bolanos ................... G08B 5/36
2020/0272154 A1 * 8/2020 Bearup .................. H05B 45/20
2020/0371523 A1 * 11/2020 Katayama ............ G05D 1/0214
2020/0375102 A1 12/2020 Arendt et al.
2021/0011474 A1 1/2021 Anderson et al.
2021/0153709 A1 5/2021 Luyckx

FOREIGN PATENT DOCUMENTS

GB 2350696 A 12/2000
JP 3738488 B2 1/2006
KR 20210137744 A 11/2021
RU 2591912 A 7/2016
WO 2013047165 A1 4/2013
WO 2020117766 A1 6/2020
WO 2020176529 A1 9/2020

* cited by examiner

SURFACE MAINTENANCE MACHINE LIGHT PROJECTION

TECHNICAL FIELD

This disclosure relates generally to light projection mechanisms and surface maintenance machines. Embodiments are disclosed herein relating to light projection mechanisms for projecting light onto a ceiling surface. More particularly, certain such embodiments disclosed herein include surface maintenance machines having a light projection mechanism that is configured to project light onto a ceiling surface.

BACKGROUND

Surface maintenance machines can be used to perform one or more surface maintenance tasks such as brushing, cleaning, polishing, and striping surfaces.

A variety of environments in which a surface maintenance machine is utilized to perform one or more surface maintenance tasks can make it difficult to see the surface maintenance machine throughout the duration of the one or more surface maintenance tasks. For example, in many operating environments, such as grocery stores, retail stores, and warehouses, obstacles, such as shelving or product stands, can block a visual perception of the surface maintenance machine when operating. This inability to visually discern the surface maintenance machine during operation in such environments can prevent quick and easy information gathering as to the surface maintenance machine, including information as to the surface maintenance machine's location and/or status.

SUMMARY

In general, this disclosure is directed to embodiments of light projection mechanisms and surface maintenance machines. Certain such embodiments disclosed herein include surface maintenance machines having a light projection mechanism that is configured to project light onto a ceiling surface.

Such embodiments that are configured to project light onto a ceiling surface can be useful in reducing the time it takes to discern information relating to a surface maintenance machine. For example, these embodiments that are configured to project light onto a ceiling surface can reduce the time it takes to learn the surface maintenance machine's location and/or status. By projecting light onto a ceiling surface, the surface maintenance machine's location and/or status can be discerned quickly at a glance across a distance even if one or more obstacles (e.g., shelving, product stands, etc.) block a direct line of sight to the surface maintenance machine itself. In some cases, to signify different types of status information relating to the surface maintenance machine, different states of the light projected onto the ceiling surface (e.g., different colors, steady state light projection, flashing light projection, etc.) can be used.

To perform one or more surface maintenance tasks, surface maintenance machines can be autonomously or manually driven along a surface. In the case of an autonomously driven surface maintenance machine, the inability to learn the surface maintenance machine's location and/or status at a glance can be particularly burdensome given that a user may not be present at the surface maintenance machine during operation. As such, equipping an autonomously driven surface maintenance machine with a light projection mechanism that is configured to project light onto a ceiling surface can be particularly useful in allowing for quick and easy information gathering at a glance, even where a direct line of sight to the surface maintenance machine is blocked by one or more obstacles in the operating environment. Such quick and easy information gathering can allow for determining, for instance, where the surface maintenance machine is currently operating and/or whether the surface maintenance machine is operating as intended. And, as a result, in instances where the surface maintenance machine is operating differently than intended and/or needs assistance, the use of the light projection mechanism can reduce the time needed to become aware of, and address, the situation.

One exemplary embodiment includes a surface maintenance machine. This surface maintenance machine includes a body, a surface maintenance tool coupled to the body, processing circuitry supported at the body, and a light projection mechanism supported at the body and coupled to the processing circuitry. The light projection mechanism includes a light housing, a light emitting element within the light housing, and a projection lens that is configured to focus light emanating from the light emitting element. The light projection mechanism is configured to project light onto a ceiling surface that is above a floor surface along which the surface maintenance machine is configured to perform a surface maintenance task using the surface maintenance tool.

In a further embodiment of this surface maintenance machine, the light emitting element has a light intensity and the projection lens has a light focus, and the light intensity and the light focus are configured such that the light projection mechanism is configured to project light onto the ceiling at a distance of at least fifteen feet from the light projection mechanism. In some such embodiments, the light projection mechanism can be configured such that the light projected onto the ceiling surface has a ceiling projected light area that is within an envelope defined by the body of the surface maintenance machine. For example, the body can define a central longitudinal axis, and the body can include a maximum body width defined in a first direction perpendicular to the central longitudinal axis and a maximum body length defined in a second direction parallel to the central longitudinal axis, and the envelope can be an area defined by the maximum body width and the maximum body length. Also, in some such embodiments, the light projection mechanism can be configured such that the light projected onto the ceiling surface has the ceiling projected light area of at least thirty-six square inches and no more than 1,296 square inches.

In a further embodiment of this surface maintenance machine, the light intensity of the light emitting element can be, for instance, greater than 3,000 candela, greater than 4,000 candela, greater than 5,000 candela, greater than 6,000 candela, or greater than 7,000 candela. Likewise, as further examples, the projection lens can have, for instance, a lens focal angle that produces the output light emission at beam angle less than eight degrees, less than ten degrees, or less than twelve degrees.

In a further embodiment of this surface maintenance machine, the projection lens can be positioned between 0.5 inch and 6 inches from the light emitting element In a further embodiment of this surface maintenance machine, the surface maintenance machine can be configured to operate in an autonomously driven mode, and the light emitting element can be in an enabled state when the surface maintenance machine is in the autonomously drive mode. In some such embodiments, the light projection mechanism can be configured to project light onto the ceiling surface in a first light state when the surface maintenance machine is in a first autonomously driven mode condition, and the light projection mechanism can be configured to project light onto the ceiling surface in a second light state when the surface maintenance machine is in a second autonomously driven mode condition, where the first autonomously driven mode condition is different than the second autonomously driven mode condition and the first light state is different than the second light state. For instance, the first autonomously driven mode condition can be selected from the group consisting of: low surface maintenance machine fluid level, low surface maintenance machine battery level, and surface maintenance machine mobility deviation. And, for instance, the first light state can be a first color and the second light state can be a second, different color. Also, in some such embodiments, the surface maintenance machine can further include a manual/autonomous mode user input mechanism coupled to the light projection mechanism. When the manual/autonomous mode user input mechanism is actuated to transition the surface maintenance machine from a manually driven mode to the autonomously driven mode, the light projection mechanism can be configured to transition from a disabled state to the enabled state.

In a further embodiment of this surface maintenance machine, the light projection mechanism can further include a light diffuser positioned to receive light emanating from the light emitting element. This light diffuser can include a diffuser housing. The diffuser housing can include a first diffuser housing end, a second diffuser housing end that is opposite the first diffuser housing end, and one or more side walls extending between the first diffuser housing end and the second diffuser housing end. The one or more side walls can include a translucent material through which light received from the light emitting element at the light diffuser is output radially from the light diffuser housing. The diffuser housing can define a channel extending from the first diffuser housing end to the second diffuser housing end, the first diffuser housing end can be positioned adjacent the projection lens, and the second diffuser housing end can include an opening defined in the diffuser housing such that a portion of light received from the light emitting element at the light diffuser passes through the channel and out the opening. In some such embodiments, the light diffuser housing can be configured to output light received from the light emitting element both radially via the translucent material at the one or more side walls and vertically via the channel and the opening.

Another embodiment includes a light projection mechanism. This light projection mechanism embodiment includes a light housing, light projection processing circuitry supported at the light housing, a light emitting element within the light housing and coupled to the processing circuitry, and a projection lens supported at the light housing. The light projection processing circuitry includes an input that is configured to couple to a surface maintenance machine controller. The projection lens is configured to focus light emanating from the light emitting element. And, the light projection mechanism is configured to project light onto a ceiling surface at a distance of at least fifteen feet from the light projection mechanism.

In a further embodiment of this light projection mechanism, the light emitting element can have a light intensity and the projection lens can have a light focus, and the light intensity and the light focus can be configured such that the light projection mechanism is configured to project light onto the ceiling at the distance of at least fifteen feet from the light projection mechanism. In some such embodiments, the light emitting element can be a light emitting diode positioned within the light housing adjacent the projection lens.

In a further embodiment of this light projection mechanism, the input of the light projection processing circuitry is configured to receive, from the surface maintenance machine controller, an enable state command corresponding to an autonomously driven mode of the surface maintenance machine, and, in response to receiving the enable state command, the light projection processing circuitry is configured to transition the light emitting element from a disabled state to an enabled state.

In a further embodiment of this light projection mechanism, the light projection mechanism additionally includes a light diffuser positioned to receive light emanating from the light emitting element. The light diffuser includes a diffuser housing. The diffuser housing includes a first diffuser housing end, a second diffuser housing end that is opposite the first diffuser housing end, a channel extending from the first diffuser housing end to the second diffuser housing end, and one or more side walls extending between the first diffuser housing end and the second diffuser housing end. The one or more side walls include a translucent material through which light received from the light emitting element at the light diffuser is output radially from the light diffuser housing. The first diffuser housing end is positioned adjacent the projection lens, and the second diffuser housing end includes an opening defined in the diffuser housing such that a portion of light received from the light emitting element at the light diffuser passes through the channel and vertically out the opening.

The details of one or more examples are set forth in the accompanying drawings and the description below. Other features, objects, and advantages will be apparent from the description and drawings, and from the claims.

BRIEF DESCRIPTION OF DRAWINGS

The following drawings are illustrative of particular embodiments of the present invention and, therefore, do not limit the scope of the invention. The drawings are intended for use in conjunction with the explanations in the following description. Embodiments of the invention will hereinafter be described in conjunction with the appended drawings, wherein like numerals denote like elements. The features illustrated in the drawings are not necessarily to scale, though embodiments within the scope of the present invention can include one or more of the illustrated features at the scale shown.

DETAILED DESCRIPTION

Exemplary embodiments of the present disclosure can be included, and executed, at a surface maintenance machine 200. Such surface maintenance machine 200 can be operated in a manually driven mode, an autonomously driven mode, or interchangeably operated between a manually driven mode and an autonomously driven mode. In the manually driven mode, the surface maintenance machine 200, as illustrated in the exemplary embodiments shown, can be a walk-behind machine, though in other embodiments within the scope of the present disclosure, when in the manually drive mode, the features described herein can be applied to a ride-on surface maintenance machine as well. And, both walk-behind and ride-on type surface maintenance machines can be operated in the autonomously driven mode.

Such surface maintenance machines can be used to perform one or more surface maintenance operations (e.g., brushing, cleaning, polishing, striping, etc.) at various operation environments, including indoor (buildings, warehouses, garages, hallways, etc.) locations. In some operating environments, one or more obstacles (e.g., shelving, product stands, etc.) may block a direct line of sight to the surface maintenance machine 200 when operating. Accordingly, various embodiments disclosed herein can be configured to project light onto a ceiling surface and, thereby, help to reduce the time it takes to discern information relating to the surface maintenance machine 200. For example, these embodiments that are configured to project light onto a ceiling surface can reduce the time it takes to learn the surface maintenance machine's location and/or status. By projecting light onto a ceiling surface, the surface maintenance machine's location and/or status can be discerned quickly at a glance across a distance even if one or more obstacles block a direct line of sight to the surface maintenance machine 200.

Figure 1:
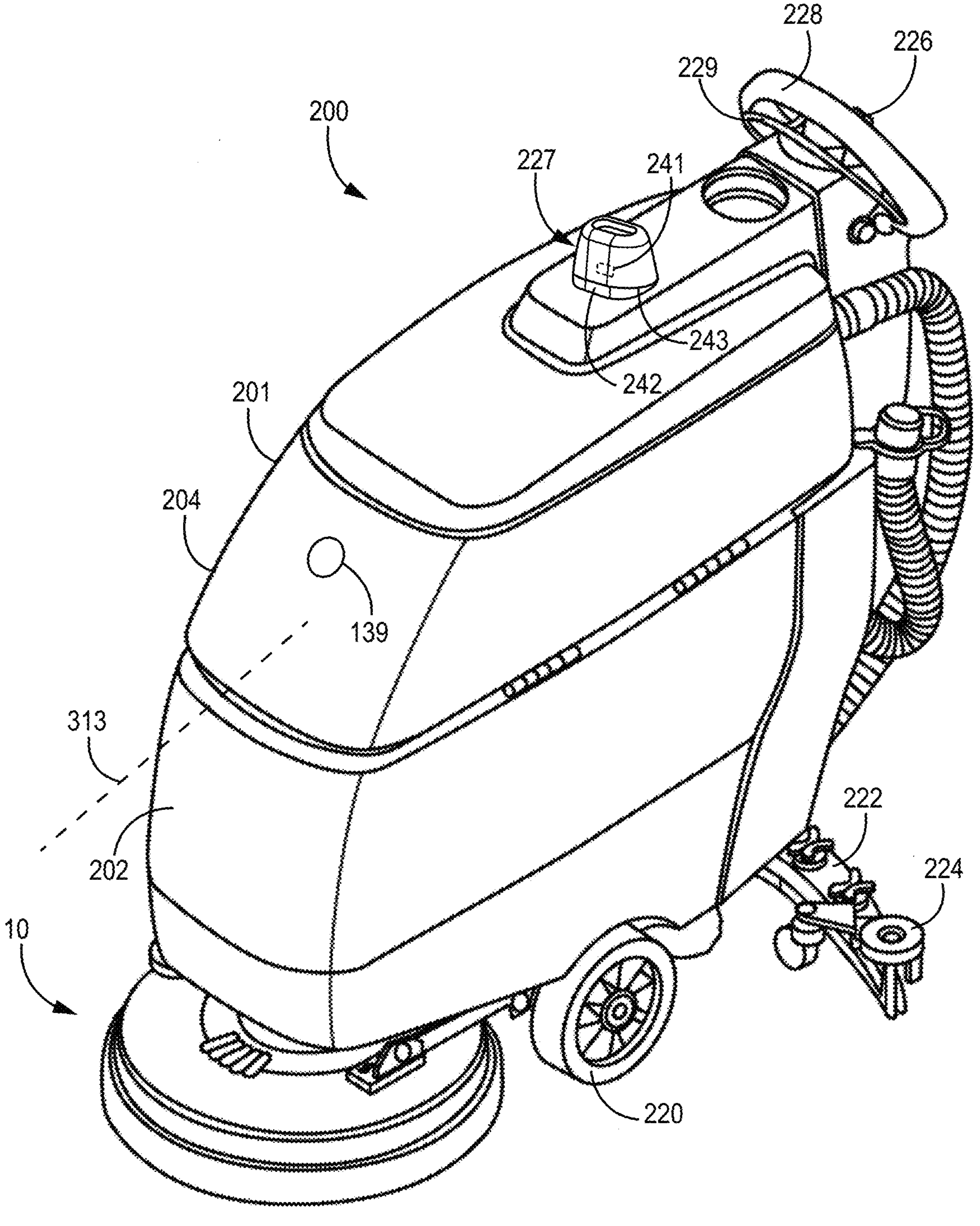
FIG. 1 is a perspective view of an exemplary embodiment a surface maintenance machine that includes a light projection mechanism.
Figure 2:
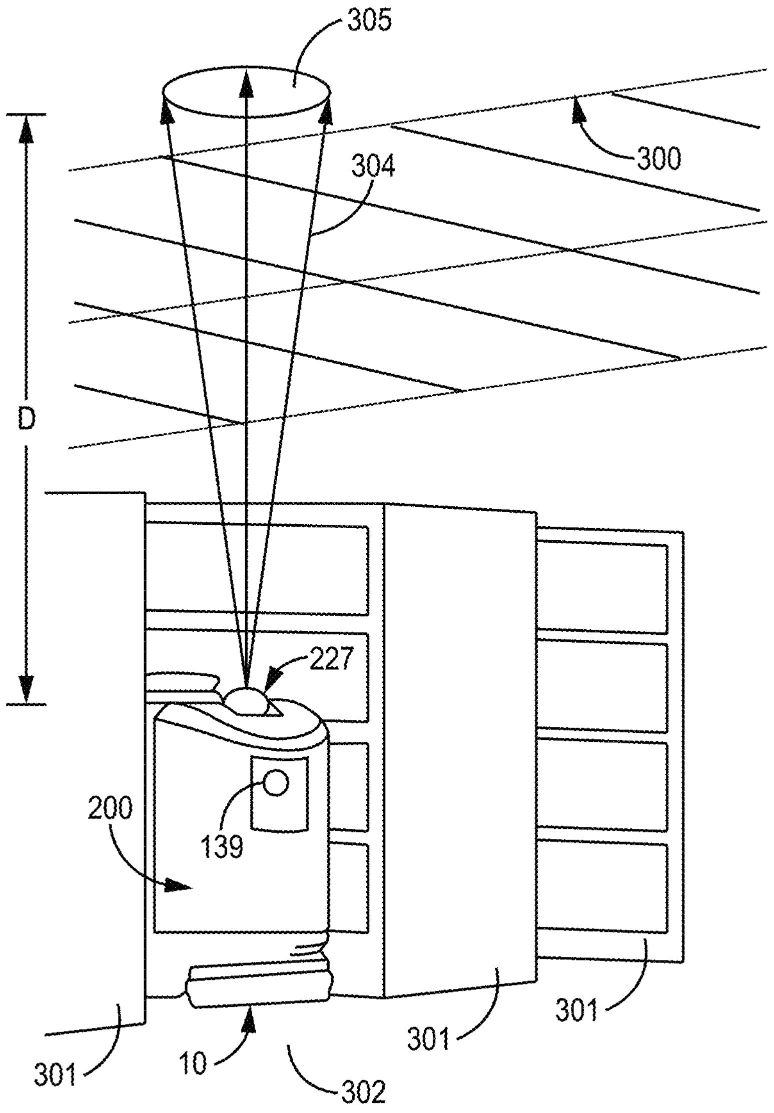
FIG. 2 is a perspective view of the surface maintenance machine of FIG. 1 using the light projection mechanism to project light onto a ceiling surface.
Figure 3:
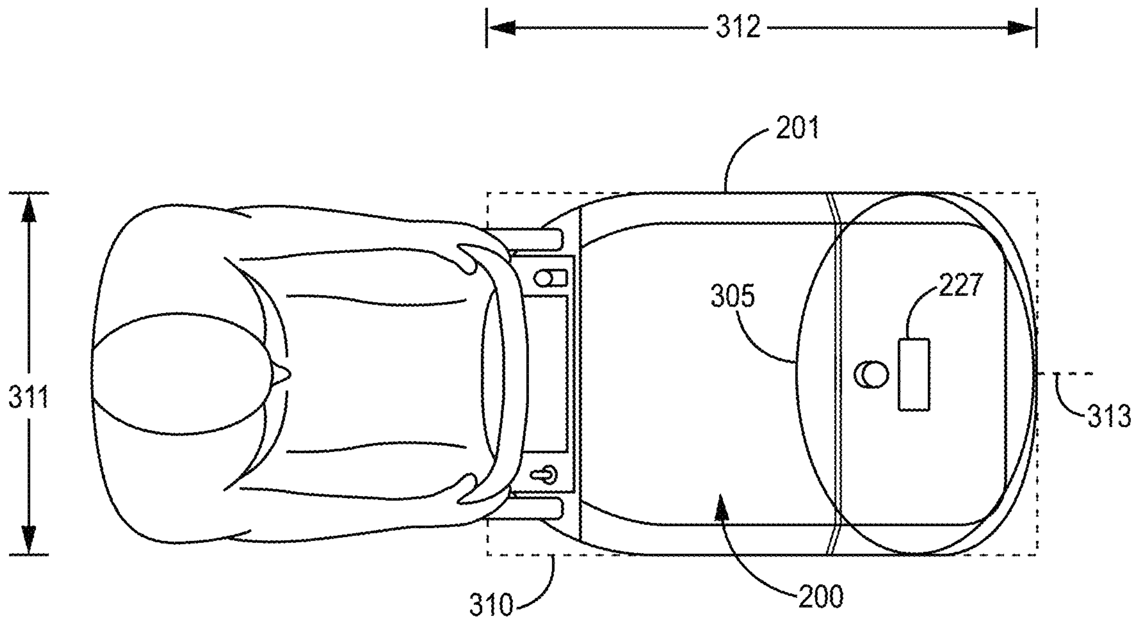
FIG. 3 is a plan view looking down at the surface maintenance machine of FIG. 1.
Figure 4:
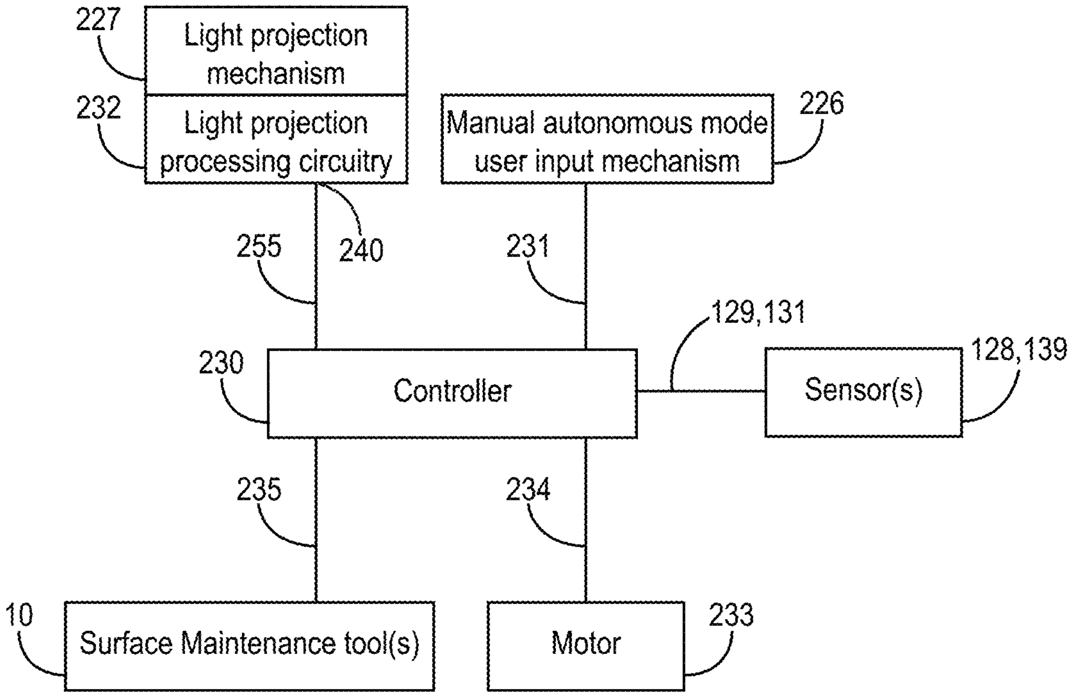
FIG. 4 is a block diagram of an exemplary embodiment of various components that can be included at the surface maintenance machine of FIG. 1.

FIGS. 1-4 illustrate an exemplary embodiment of surface maintenance machine 200 that includes a light projection mechanism 227. Specifically, FIG. 1 is a perspective view of surface maintenance machine 200 including the light projection mechanism 227. FIG. 2 is a perspective view of surface maintenance machine 200 using the light projection mechanism 227 to project light onto a ceiling surface 300. FIG. 3 is a plan view looking down at surface maintenance machine 200. FIG. 4 is a block diagram of various exemplary components that can be included at surface maintenance machine 200.

In the illustrated embodiment here, surface maintenance machine 200 is a walk-behind type surface maintenance machine (e.g., for performing one or more surface maintenance tasks at a hard floor surface) that can be configured to interchangeably operate between a manually driven mode and an autonomously driven mode. In other embodiments, surface maintenance machine 200 can instead be a ride-on machine that can be configured to interchangeably operate between a manually driven mode and an autonomously driven mode. Embodiments of surface maintenance machine 200 include a body 201, such as a motorized mobile body, as well as one or more components that are supported at the body 201. The body 201 can be supported on wheels 220 for travel over a surface on which a surface maintenance operation is to be performed. In the illustrated embodiment, the mobile body 201 includes a grab handle 228, a bail 229, and operator controls, including a manual/autonomous mode user input mechanism 226. The machine 200 can be powered by an on-board power source, such as one or more batteries.

In the illustrated embodiment, the body 201 of the machine 200 includes a base 202 and a lid 204, which can be attached along a side of the base 202 by hinges so that the lid 204 can pivot to provide access to the interior of the body 201. The interior of the body 201 can include a power source for the machine 200, such as one or more rechargeable battery sources, and motor, such as an electric motor (e.g., a permanent magnet alternating current ("AC") motor), that receives power from the power source and converts that power into a motive force that is provided to one or more of the wheels 220 to move the machine 200. The interior of the body 201 can also include a fluid source tank and a fluid recovery tank. The fluid source tank contains a fluid source, such as a cleaner or sanitizing fluid, that can be applied to the floor surface during one or more surface maintenance operations. The fluid recovery tank can hold recovered fluid source that has been applied to the floor surface and soiled.

The base 202 of the body 201 can support a fluid recovery device 222, which in the illustrated embodiment includes a vacuum squeegee 224. The squeegee 224 is in vacuum communication with a fluid recovery tank. In operation, the squeegee 224 recovers soiled fluid from the floor surface and helps transport it to the recovery tank. The body 201, via the base 202, can further support one or more surface maintenance tools 10 (e.g., a cleaning head assembly). The surface maintenance tool 10 can be coupled to the body 201 and movable relative to the body 201, For example, the surface maintenance tool 10 can be lowered away from the body 201 to a cleaning position, in contact with the floor surface, and raised toward the body 201 to a traveling position, in which the surface maintenance tool 10 is not in contact with the floor surface. The surface maintenance tool 10 can be coupled to machine 200 using any known mechanism, such as a suspension and lift mechanism. The surface maintenance tool 10, for example, can include one or more rotatable brushes, such as disc-shaped or cylindrical scrub brushes. Alternatively, the surface maintenance tool 10 can include other cleaning tools such as a sweeping brush, or polishing, burnishing or buffing pads. The brushes or pads are held by a driver (e.g., a brush driver or a pad driver respectively) that, together with the brush or pad, is detachable from a hub of the surface maintenance tool 10. In certain embodiments, the surface maintenance tool 10 includes a magnetic coupling system that allows for touch-free attachment and aligning between the pad driver or brush driver and the hub.

When the machine 200 is operated in a manually driven mode, the grab handle 228 and the bail 229 can be configured to cause the machine 200 to move along a surface at which a surface maintenance task is desired to be performed. To begin moving the machine 200, the user can grasp the grab handle 228 and actuate the bail 229 to cause a motive force to be applied at the machine 200. For example, the bail 229 can be configured to be actuated via a user applying a pull force at the bail 229 (e.g., to move the bail 229 toward the grab handle 228). A first actuation (e.g., a user applied pull force at the bail 229) of the bail 229 can activate application of the motive force at the machine 200, and a second actuation (e.g., a user releasing, and thus terminating the pull force at, the bail 229) of the bail 229 can terminate application of the motive force at the machine 200. The grab handle 228 can provide a surface at which a user of the machine 200 can grasp the machine 200 during manual operation and apply desired user user-originated forces. For instance, in the manually driven mode, the grab handle 228 can be grasped and used by a user to apply user forces at the machine 200 in different directions to cause the machine 200 to move forward, move rearward, and turn in various directions.

The machine 200 can include a controller 230 (illustrated at FIG. 4). The controller 230 can include processing circuitry and be supported at the body 201, and the controller 230 can be configured, via the processing circuitry, to execute one or more of the various features disclosed herein. The controller 230 can be, for example, a programmable processor that is configured to execute non-transitory computer-readable instructions stored in a non-transitory memory component (e.g., at the controller 230). Execution of the non-transitory computer-readable instructions at the controller 230 can cause the machine 200 to perform one or more various features disclosed herein.

The manual/autonomous mode user input mechanism 226 can be coupled to the controller 230, such as via a line 231, as shown in FIG. 4. The manual/autonomous mode user input mechanism 226 can receive one or more inputs thereat from the user of the machine 200 and, as a result, send one or more corresponding input signals to the controller 230 via the line 231. For example, the manual/autonomous mode user input mechanism 226 can be configured, when actuated, to send a mode control signal to the controller 230 corresponding to one of a manual mode command and an autonomous mode command. For instance, a first actuation of the manual/autonomous mode user input mechanism 226 can cause the manual/autonomous mode user input mechanism 226 to send a manual mode control signal to the controller 230, and a second, different actuation of the manual/autonomous mode user input mechanism 226 can cause the manual/autonomous mode user input mechanism 226 to send an autonomous mode control signal to the controller 230. As illustrative examples, the first actuation of the manual/autonomous mode user input mechanism 226 can be a user providing a manual mode selection at the manual/autonomous mode user input mechanism 226 (e.g., via a manual mode button at the manual/autonomous mode user input mechanism 226) and the second actuation of the manual/autonomous mode user input mechanism 226 can be a user providing an autonomous mode selection at the manual/autonomous mode user input mechanism 226 (e.g., via an autonomous mode button at the manual/autonomous mode user input mechanism 226).

When the controller 230 receives the manual mode command from the manual/autonomous mode user input mechanism 226, the controller 230 can, in response, execute non-transitory computer-readable instructions to cause the machine 200 to be configured for operation in a manually driven mode. Likewise, when the controller 230 receives the autonomous mode command from the manual/autonomous mode user input mechanism 226, the controller 230 can, in response, execute non-transitory computer-readable instructions to cause the machine 200 to be configured for operation in an autonomously driven mode. As such, in one embodiment the machine 200 can be switched between manually driven and autonomously driven modes (e.g., via actuation of the manual/autonomous mode user input mechanism 226). In another embodiment, the machine 200 can be solely an autonomously driven machine without a manually driven mode. And, in yet another embodiment, the machine 200 can be solely a manually driven machine without an autonomously driven mode.

In embodiments where the surface maintenance machine 200 is configured to operate in the autonomously driven mode, to facilitate operation of the machine 200 in the autonomously driven mode, the machine 200 can include onboard at the body 201 one or more vision sensors 139. The vision sensor 139 can be coupled to the controller 130, such as via a line 131 (shown in FIG. 4). The vision sensor 139 can be configured to scan and detect features in the ambient environment of the machine 200. In some embodiments, the vision sensor 139 can include one or more of visible light and/or thermal (infrared) vision cameras, LIDAR sensors, laser beacons, ultrasound sensors, and the like to detect features of the environment (such as physical boundaries and the like). In some embodiments, the vision sensors 139 can be provided at various, spaced apart locations on the machine 200 (e.g., front, lateral sides, rear, and the like) so as to obtain data corresponding to areas at different locations around the machine 200 over a relatively wide field of view. In some particular embodiments, the field of view of the vision sensors 139 can correspond to an angle of between about 200 degrees and about 300 degrees, and a radius of between about 50 feet and 150 feet. In one yet more particular embodiment, the field of view of the vision sensors 139 can be approximately 240 degrees and a radius of approximately 90 feet.

In certain embodiments, also to help facilitate operation of the surface maintenance machine 200 in the autonomously driven mode, the machine 200 can also include a location sensor 128. The location sensor 128 can be coupled to the controller 130, such as via a line 129 (shown in FIG. 4), and the location sensor 128 can include a wireless transceiver configured to output a wireless signal and receive a wireless signal. The location sensor 128 can permit ascertaining localization the machine 200, such as before, during, or after mapping of a location at which the machine 200 is to operate autonomously. In some embodiments, the location sensor 128 can include a Global Positioning System ("GPS") sensor. Alternatively, or in addition, the location sensor 128 can include an inertial measurement unit (e.g., compass, accelerometer, gyroscope, magnetometer and the like). In addition, additional components such as wireless communication beacons (e.g., WiFi or Bluetooth) can be provided at the location sensor 128 to improve accuracy of localization.

To further assist operation of the surface maintenance machine 200 in the autonomously driven mode, the machine 200 can include a mapping system. The mapping system can, for instance, be executed at the controller 130, such as via a mapping processor and mapping computer-executable instructions at the controller 130. The mapping processor can have one or more integrated circuits that can be in electrical communication with an on-board or a remote non-transitory memory component. The memory component can store mapping instructions in the form of a mapping software program that can be executed by the mapping processor to generate a map for use by the machine 200 to navigate a location in the autonomously drive mode. The mapping processor can be coupled (e.g., via the controller 130) to the one or more vision sensors 139 and/or location sensor 128. For instance, the mapping processor can be coupled (e.g., via electrical circuits provided on the machine 200) to the vision sensors 139 and/or location sensor 128 such that data collected by vision sensors 139 (e.g., electrical signals representative thereof) and/or the location sensor 128 can be transmitted to the mapping processor via the electrical circuits. The mapping processor can also send control signals to initiate data collection at the vision sensors 139 and/or the location sensor 128.

In some examples, the mapping system can also include a visualization processor. The visualization processor can be provided as a part of the controller 130 (e.g., GPU component at the controller 130) at the surface maintenance machine 200. The visualization processor can have one or more integrated circuits that can be in electrical communication with the mapping processor. Additionally, the visualization processor can be in electrical communication with the on-board and/or remote memory component. The memory can store computer-readable visualization instructions in the form of a visualization software program that can be executed by the visualization processor to generate a map of the location at which the machine 200 is to be autonomously operated. The controller 130 can then execute the generated map to provide control signals to the motor of the machine 200.

FIG. 2 shows the surface maintenance machine 200 using the light projection mechanism 227 to project light 304 onto a ceiling surface 300. As noted, when the surface maintenance machine 200 is deployed in an operating environment, for instance in the autonomously driven mode, the light projection mechanism 227 can help facilitate ascertaining information relating to the surface maintenance machine 200 in a quick and convenient manner. In particular, when the surface maintenance machine 200 is operating in an environment with one or more obstacles, such as shelving 301 shown in FIG. 2, the light projection mechanism 227 can be configured to project light onto the ceiling surface 300 to convey information, such as location and/or status condition of the machine 200, even though the shelving 301, or other obstacle, blocks a direct line of sight to the machine 200. Accordingly, the light projection mechanism 227 can be configured to project light onto the ceiling surface 300 that is above a floor surface 302 along which the machine 200 is configured to perform the surface maintenance task using the surface maintenance tool 10. In this way, a direct line of sight, over the one of more obstacles, such as the shelving 301, to the light projected onto the ceiling surface 300 via the light projection mechanism 227 can be provided and, thereby, allow for quick and convenient information conveyance relating to the machine 200.

As will be discussed in further detail later with respect to the figures showing various embodiments of the light projection mechanism 227, the light projection mechanism 227 can include a light emitting element (e.g., a light emitting diode, or "LED") 241 within a light housing 242 and a projection lens 243 that is configured to focus light emanating from the light emitting element 241. The light emitting element 241 can have a light intensity, and the projection lens 242 can have a light focus. Other embodiments within the scope of the present disclosure can include a reflector member, in addition to or as an alternative to the projection lens 243. For example, the reflector member can be adjacent to and surround (e.g., circumferentially) at least a portion, or all (e.g., surround circumferentially at three hundred and sixty degrees), of the light emitting element 241. As one specific example, the reflector member can include a central aperture though which the light emitting element 241 extends and the reflector member can extend around the light emitting element 241 and up in elevation (e.g., at an increasing width, or diameter, as defined between opposite wall members of the reflector member) from the light emitting element 241.

The light intensity, of the light emitting element 241, and the light focus, of the projection lens 242 can be configured such that the light projection mechanism 227 is configured to project light onto the ceiling surface 300 at a predetermined distance D, as shown in FIG. 2, from the light projection mechanism 227. The predetermined distance D at which the light projection mechanism 227 is configured to project light onto the ceiling surface 300 can be a distance sufficient to extend above typical obstacles present in the operating environment of the surface maintenance machine 200. For example, in some embodiments, the predetermined distance at which the light projection mechanism 227 is configured to project light onto the ceiling surface 300 can be at least ten feet from the light projection mechanism 227, at least fifteen feet from the light projection mechanism 227, at least twenty feet from the light projection mechanism 227, at least twenty five feet from the light projection mechanism 227, or at least thirty feet from the light projection mechanism 227. As additional examples, to facilitate light projection at the predetermined distance D from the light projection mechanism 227, the light intensity of the light emitting element 241 can be, for instance, greater than 3,000 candela, greater than 4,000 candela, greater than 5,000 candela, greater than 6,000 candela, or greater than 7,000 candela. Likewise, as further additional examples, to facilitate light projection at the predetermined distance D from the light projection mechanism 227, the projection lens 242 can have, for instance, a lens focal angle that produces the output light emission at beam angle less than eight degrees, less than ten degrees, or less than twelve degrees.

Notably, the inventors have discovered that light intensity values for the light emitting element 241 and light focus values for the projection lens 242 within the noted ranges can act to help facilitate projection of light onto the ceiling surface 300 at the noted predetermined distances D, such as at least fifteen feet. These noted value ranges have been discovered by the inventors to help synergistically balance the need to project light at the predetermined distance D sufficient to clear beyond obstacles in typical surface maintenance machine operating environments while maintaining the projected light at the ceiling surface 300 at a sufficient focus so as to be clearly discernible by an observer at line of sight distances typical in these same operating environments.

The light 304 projected by the light projection mechanism 227 onto the ceiling surface 300 can define a ceiling projected light area 305 at the ceiling surface 300. As shown in the example of FIG. 2, the light 304 projected by the light projection mechanism 227 extends the predetermined distance D beyond the top end of the shelving 301 and, at the same time, results in a ceiling projected light area 305 at the ceiling surface 300 having a sufficient focus to allow for a clear visualization of the projected light at the ceiling surface 300 by an observer at relatively distance locations elsewhere in the operating environment. The noted ranges for the light intensity value, of the light emitting element 241, and the light focus value, of the projection lens 242, can facilitate this relatively clear focus of the ceiling projected light area 305 at the ceiling surface 300 at the predetermined distance D extending beyond, and clearing, the top of obstacles adjacent the surface maintenance machine 200. In the illustrated example, the ceiling projected light area 305 is a generally circular, though in other embodiments within the scope of this disclosure the ceiling projected light area 305 can be other shapes, including elliptical, a half ellipse, oval, square, and rectangular. Indeed, in some embodiments, the light projection mechanism 227 can be configured to project light onto the ceiling surface 300 to create multiple, different shapes of the ceiling projected light area 305. For instance, the light projection mechanism 227 can be configured to change the shape of the ceiling projected light area 305 at the ceiling surface 300 from one shape to another different shape as a means for communicating information relating to the surface maintenance machine 200, such as a change in a condition at the surface maintenance machine 200.

As best seen in FIG. 3, in certain embodiments, the light projection mechanism 227 can be configured such that the light projected onto the ceiling surface 300 has the ceiling projected light area 305 that is within an envelope 310 defined by the body 201 of the surface maintenance machine 200. The envelope 310, of the body 201, can be an area defined by a maximum body width 311 and a maximum body length 312. For example, the body 201 of the surface maintenance machine 200 can define a central longitudinal axis 313. The body 201 can include the maximum body width 311 defined in a first direction perpendicular to the central longitudinal axis 313, and the body 210 can include the maximum body length 312 defined in a second direction parallel to the central longitudinal axis 313. As various examples, depending on the specific model of the surface maintenance machine 200, the maximum body width 311 can, in some cases, range from fifteen inches to sixty-five inches, and the maximum body length 312 can, in some cases, range from eighteen inches to 110 inches. As shown in FIG. 3, the ceiling projected light area 305, present on the ceiling surface 300, can be within this envelope 310 defined by the body 201 of the surface maintenance machine 200. As examples, the light projection mechanism 227 can be configured such that the light projected onto the ceiling surface 300 has the ceiling projected light area 305 of at least thirty-six square inches and no more than 1,296 square inches, of at least sixty-four square inches and no more than 900 square inches, or of at least 100 square inches and no more than 625 square inches. The inventors have discovered that the ceiling projected light area 305 within the noted ranges can be within the envelope 310 and yet provide the ceiling projected light area 305 sufficiently large enough to be seen across various distances within typical surface maintenance machine operating environments.

As noted, the surface maintenance machine 200 can be configured to operate in a manually drive mode or an autonomously driven mode (or interchangeable between the manually and autonomously driven modes). Though the light projection mechanism 227 can be particularly useful when the surface maintenance machine 200 is configured to operate in the autonomously driven mode. This can be the case since in the autonomously driven mode there may not be an operator, or other personnel, in a direct line of sight to the surface maintenance machine 200 when it is operating, and, accordingly, the light projection mechanism 227 can be useful in conveying information, via the light projected onto the ceiling surface 300, relating to the surface maintenance machine 200 at a location—on the ceiling surface 300—that is within a direct line of sight of an appropriate observer. Thus, in some embodiments where the surface maintenance machine 200 is configured to be operate in the autonomously driven mode, the light projection mechanism 227 can be configured such that the light emitting element 241 can be in an enabled state when the surface maintenance machine 200 is in the autonomously driven mode. When the light emitting element 241 is in the enabled state, the light emitting element 241 can emit light as discussed elsewhere herein or can be ready to emit light upon receiving a light on command from the processing circuitry of the light projection mechanism 227 and/or the controller of the surface maintenance machine 200.

The surface maintenance machine 200, as previously noted, can include the manual/autonomous mode user input mechanism 226. The manual/autonomous mode user input mechanism 226 can be coupled to the light projection mechanism 227 such that actuation of the manual/autonomous mode user input mechanism 226 can be communicated to the light projection mechanism 227. For example, when the manual/autonomous mode user input mechanism 226 is actuated to transition the surface maintenance machine from a manually driven mode to the autonomously driven mode, the light projection mechanism 227 can be configured to transition (e.g., transition the light emitting element 241) from a disabled state to the enabled state.

The light projection mechanism 227 can be configured to project light onto the ceiling surface 300 at different light states as a means for conveying different types of information relating to the surface maintenance machine 200. For example, the light projection mechanism 227 can be configured to project light onto the ceiling surface 300 in a first light state when the surface maintenance machine 200 is in a first autonomously driven mode condition. And, the light projection mechanism 227 can be configured to project light onto the ceiling surface 300 in a second light state when the surface maintenance machine 200 is in a second autonomously driven mode condition, where the first autonomously driven mode condition is different than the second autonomously driven mode condition and the first light state is different than the second light state. In this way, an observer of the ceiling projected light area 305 on the ceiling surface 300 can see the particular light state of the ceiling projected light area 305 and, based on the particular light state corresponding to a particular autonomously driven mode condition of the surface maintenance machine 200, discern a current status condition of the surface maintenance machine 200 despite the observer potentially lacking a direct line of sight to the surface maintenance machine 200.

As to the first and second different autonomously drive mode conditions, the first autonomously driven mode condition can be a warning of an upcoming error state, or an indication of the presence of a current error state, at the surface maintenance machine, while the second autonomously driven mode condition can be a normal operational state (e.g., operating as preprogrammed) of the surface maintenance machine 200. For instance, the first autonomously driven mode condition can be selected from the group consisting of: low surface maintenance machine fluid level, low surface maintenance machine battery level, and surface maintenance machine mobility deviation from a previously selected course of travel (e.g., the surface maintenance machine 200 is not moving according to its preprogrammed path of travel, for instance, because it is stuck at a location in the operating environment). Also, for instance, the second autonomously driven mode condition can be an indication that the surface maintenance machine 200 is currently operating as preprogrammed and no current condition exists at the surface maintenance machine that needs near-term attention.

As to the various light states, for instance, the first light state can be a first color and the second light state can be a second, different color. Additionally or alternatively, the first light state can be one of a steady state light projection and a flashing light projection while the second light state can be the other of the steady state light projection and a flashing light projection. As noted, the different first and second light states can correspond respectively to the different first and second autonomously driven mode conditions. In this way, the different light states can serve to provide a visual cue, at the ceiling surface 300, as to the current state of the surface maintenance machine 200.

FIG. 4 illustrates a block diagram of an exemplary embodiment of various components that can be included at the surface maintenance machine 200 for executing functions, including those disclosed herein, at the surface maintenance machine 200. The surface maintenance machine 200 can include the controller 230, which itself can include processing circuitry, for receiving one or more inputs and, based on the one or more inputs, providing one or more resulting outputs, such as one or more control signals corresponding to the received one or more inputs.

As illustrated at FIG. 4, the light projection mechanism 227 can be coupled to the processing circuitry at the controller 230 via a line 255. In some embodiments, the light projection mechanism 227 can include light projection processing circuitry 232 that is configured to receive one or more control inputs from the controller 230 and, based on the one or more inputs received from the controller 230, provide one or more corresponding outputs (e.g., an output control signal) to one or more components at the light projection mechanism 227, such as to the light emitting element 241 to enable the light emitting element 241 at a predetermined light state and/or change the light state of the light emitting element 241. In this way, the controller 230 of the surface maintenance machine 200 can act to control the operation of the light projection mechanism 227, for instance enabling/disabling and/or changing a light state of the light projection mechanism 227, based on information the controller 230 receives from one or more other components at the surface maintenance machine 200.

For example, as shown for the embodiment illustrated at FIG. 4, the controller 230 can be coupled to various components of the surface maintenance machine 200 in addition to the light projection mechanism 227. For instance, the controller 230 can be coupled to the manual/autonomous mode user input mechanism 226, via the line 231, and, upon the controller 230 receiving an input signal from the manual/autonomous mode user input mechanism 226 (e.g., an input signal corresponding to user input at the manual/autonomous mode user input mechanism 226 to operate in the autonomously driven mode), the controller 230 can output a corresponding control signal to the light projection mechanism 227 (e.g., to enable the light emitting element 241 at a corresponding predetermined light state). The controller 230 can also be coupled to one or more sensor(s) that are on-board the surface maintenance machine 200, such as location sensor 128, vision sensor(s) 139, fluid tank fluid level sensor(s), and/or temperature sensor, via the line(s) 129, 131 or other line(s) connecting other various sensors to the controller 230. And, upon the controller 230 receiving an input signal from one or more of the sensor(s) (e.g., an input signal from the one or more sensor(s) corresponding to a predetermined sensed state at the respective sensor associated component), the controller 230 can output a corresponding control signal to the light projection mechanism 227 (e.g., to change the light state at the light emitting element 241, such as from the second light state, that for instance can be output when the machine 200 begins operating in the autonomously driven mode, to the first, different light state described previously). Similarly, the controller 230 can further be coupled to the motor 233 of the surface maintenance machine 200 via a line 234, and, upon the controller 230 receiving an input signal from the motor 233 (e.g., an input signal from the motor 233 corresponding to a predetermined sensed state currently present at the motor 233, such as a motor current level or torque level being different than a preset level for operation), the controller 230 can output a corresponding control signal to the light projection mechanism 227 (e.g., to change the light state at the light emitting element 241). Finally, with respect to FIG. 4, the controller 230 can further be coupled to the surface maintenance tool(s) 10 of the surface maintenance machine 200 via a line 235, and, upon the controller 230 receiving an input signal from the surface maintenance tool(s) 10 (e.g., an input signal from the surface maintenance tool(s) 10 corresponding to a predetermined sensed state currently present at the surface maintenance tool(s) 10, such as a surface maintenance tool rotational speed, torque, temperature, or position being different than that preset for operation), the controller 230 can output a corresponding control signal to the light projection mechanism 227 (e.g., to change the light state at the light emitting element 241).

Figure 5:
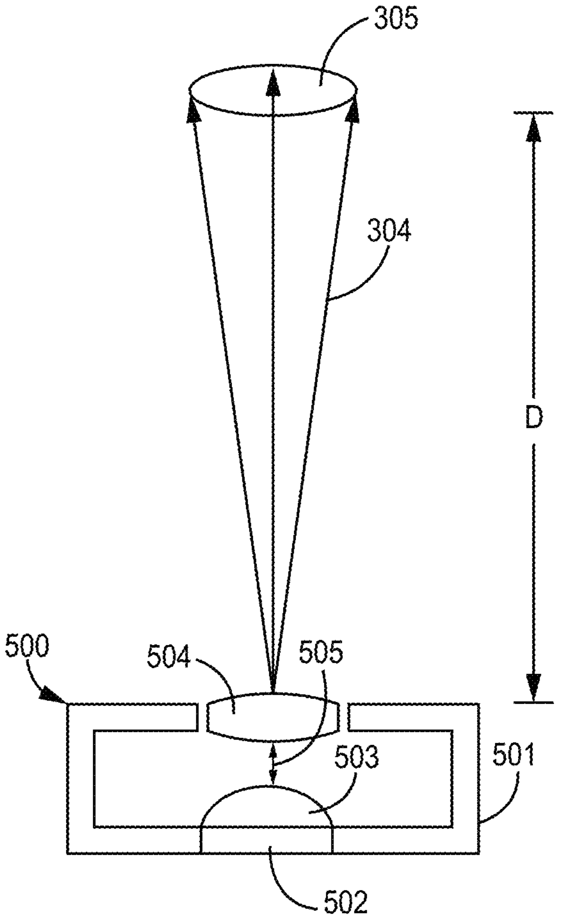
FIG. 5 is a side elevational, cross-sectional view of an exemplary embodiment of a light projection mechanism.
Figure 6:
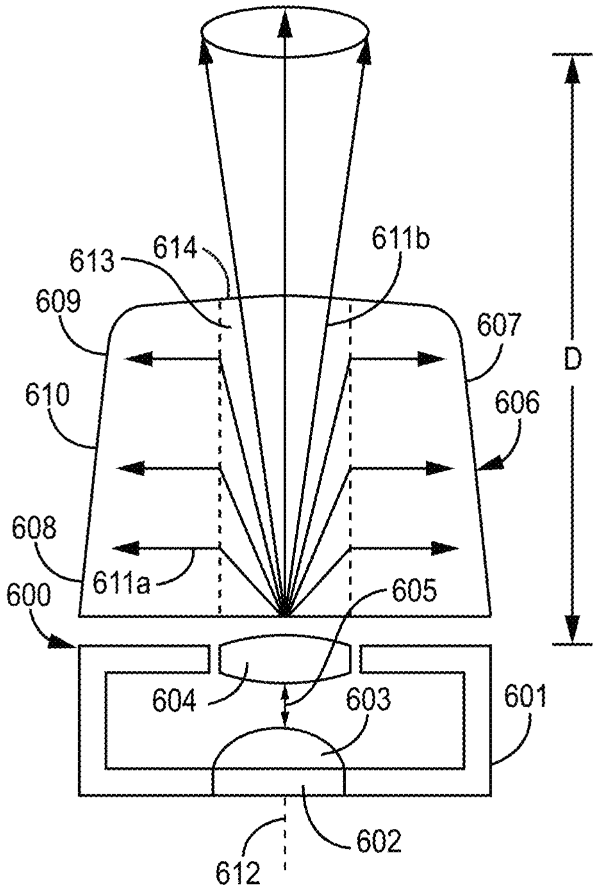
FIG. 6 is a side elevational, cross-sectional view of another exemplary embodiment of a light projection mechanism.
Figure 7:
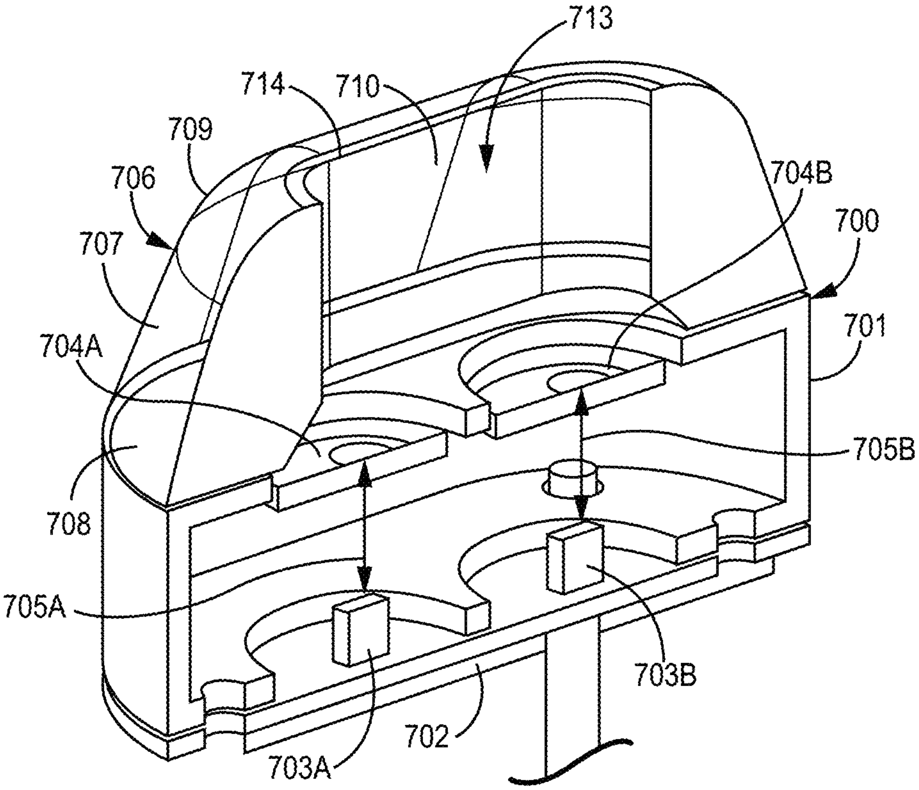
FIG. 7 is a perspective, cross-sectional view of a further exemplary embodiment of a light projection mechanism.

FIGS. 5-7 illustrate different exemplary embodiments of the light projection mechanism 227 that can be used at the surface maintenance machine 200 as described herein. As such, each of the light projection mechanism embodiments illustrated at FIGS. 5-7 can include one or more of the same (e.g., each of the same), or similar, features described previously herein with respect to the light projection mechanism 227.

FIG. 5 is a side elevational, cross-sectional view of one exemplary embodiment of a light projection mechanism 500 that can serve as the light projection mechanism used at the surface maintenance machine as described elsewhere herein. The light projection mechanism 500 includes a light housing 501, light projection processing circuitry 502 supported at the light housing 501, a light emitting element 503 within the light housing 501 and coupled to the light projection processing circuitry 502, and a projection lens 504 supported at the light housing 501. The light projection processing circuitry 502 can include an input 240 (shown at FIG. 4) that is configured to couple to the surface maintenance machine controller and, thereby, receive an output, such as a control signal, from the controller as described elsewhere herein. For instance, the input 240 of the light projection processing circuitry 502 can be configured to receive, from the surface maintenance machine controller, an enable state command corresponding to an autonomously driven mode of the surface maintenance machine, and, in response to receiving the enable state command, the light projection processing circuitry 502 can be configured to transition the light emitting element 503 from a disabled state to the enabled state. The light emitting element 503 can be, for instance, a light emitting diode ("LED") positioned within the light housing 501 adjacent the projection lens 504. The projection lens 504 can be configured to focus light emanating from the light emitting element 503. For example, the projection lens 504 can be positioned at a distance 505 from the light emitting element 502, and this distance can be in the range of 0.5 inches to 6 inches, 1 inch to 5 inches, or 2 inches to 4 inches, from the light emitting element 502.

The light projection mechanism 500 can be configured to project light 304 onto the ceiling surface at the predetermined distance D from the light projection mechanism 500, as described previously. For instance, as described previously, the light intensity, of the light emitting element 503, and the light focus, of the projection lens 504, can be configured such that the light projection mechanism 500 is configured to project light onto the ceiling surface at the predetermined distance D from the light projection mechanism 500.

FIG. 6 is a side elevational, cross-sectional view of another exemplary embodiment of a light projection mechanism 600 that can serve as the light projection mechanism used at the surface maintenance machine as described elsewhere herein. The light projection mechanism 600 can be the same as, or similar to, that described with respect to the light projection mechanism 500 of FIG. 5. Namely, similar to or the same as that described for the same termed components of the light projection mechanism 500 of FIG. 5, the light projection mechanism 600 can include a light housing 601, a light projection processing circuitry 602 supported at the light housing 601, a light emitting element 603 within the light housing 601 and coupled to the light projection processing circuitry 602, and a projection lens 604 supported at the light housing 601. And, the projection lens 604 can be positioned at a distance 605 from the light emitting element 602. However, the light projection mechanism 600 can differ from the light projection mechanism 500 in that the light projection mechanism 600 additionally includes a light diffuser 606.

The light diffuser 606 can be positioned to receive light emanating from the light emitting element 603. The light diffuser 606 can include a diffuser housing 607. The diffuser housing 607 can include a first diffuser housing end 608, a second diffuser housing end 609 that is opposite the first diffuser housing end 608, and one or more side walls 610 extending between the first diffuser housing end 608 and the second diffuser housing end 609. The diffuser housing 607 can additionally define a channel 613 extending from the first diffuser housing end 608 to the second diffuser housing end 609. The first diffuser housing end 608 can be positioned adjacent the projection lens 604, and the second diffuser housing end 609 can include an opening 614 defined in the diffuser housing 607 such that at least a portion of light 611*b* received from the light emitting element 603 at the light diffuser 606 passes (e.g., generally vertically) through the channel 613 and out the opening 614. The one or more side walls 610 can include a translucent or transparent material through which light 611*a*, received from the light emitting element 603 at the light diffuser 606, is output radially (e.g., in a direction generally perpendicular to a central longitudinal axis 612 of the light housing 602) from the light diffuser housing 607. Accordingly, the light diffuser 606 can be configured such of the light received from the might emitting element 603 at the diffuser housing 607, a portion of this light 611*b* passes through the channel 613 and out the opening 614 while a portion of this light 611*a* passes into the channel 613 and out the one or more side walls 610 generally radially before reaching the opening 614. Thus, the light diffuser housing 607 can be configured to output light received from the light emitting element 603 both generally radially, via the translucent or transparent material at the one or more side walls 610, and generally vertically, via the channel 613 and the opening 614.

FIG. 7 is a perspective, cross-sectional view of a further exemplary embodiment of a light projection mechanism 700 that can serve as the light projection mechanism used at the surface maintenance machine as described elsewhere herein. The light projection mechanism 700 can be the same as, or similar to, that described with respect to the light projection mechanism 600 of FIG. 6 except that the light projection mechanism 700 includes multiple light emitting elements—a first light emitting element 703A and a second light emitting element 703B—as well as multiple projection lenses—a first projection lens 704A and a second projection lens 704B. The first projection lens 704A can be aligned with, and correspond to, the first light emitting element 703A, and the second projection lens 704B can be aligned with, and correspond to, the second light emitting element 704B.

The inclusion of multiple light emitting elements 703A, 703B as in the embodiment of the light projection mechanism 700 illustrated at FIG. 7 can be useful for certain light projection functions that may be desired for implementation at the light projection mechanism 700. As one example, the inclusion of multiple light emitting elements 703A, 703B can be useful in projecting light from the light projection mechanism 700 onto the ceiling surface in different light states. In particular, the first light emitting element 703A can be configured to emanate light at a first light state (e.g., a first color) while the second light emitting element 703B can be configured to emanate light at a second, different light state (e.g., a second, different color). In this case, the first light emitting element 703A can be enabled in response to a first status condition at the surface maintenance machine (e.g., the first autonomously driven mode condition), and the second light emitting element 703B can be enabled in response to a second, different status condition at the surface maintenance machine (e.g., the second autonomously driven mode condition).

Other than as described above for, and illustrated different at, FIG. 7, the light projection mechanism 700 can be similar to or the same, and operate similar to, or the same as, that described for the same termed components of the light projection mechanism 500 of FIG. 5. Namely, the light projection mechanism 700 can include a light housing 701, a light projection processing circuitry 702 supported at the light housing 601, the light emitting elements 703A, 703B within the light housing 701 and coupled to the light projection processing circuitry 702, the projection lenses 704A, 704B supported at the light housing 701 and positioned, respectively, at the distances 705A, 705B from the corresponding light emitting elements 703A, 703B, a light diffuser 706 including a diffuser housing 707. The diffuser housing 707 can include a first diffuser housing end 708, a second diffuser housing end 709 that is opposite the first diffuser housing end 708, and one or more side walls 710 extending between the first diffuser housing end 708 and the second diffuser housing end 709. The diffuser housing 707 can additionally define a channel 713 extending from the first diffuser housing end 708 to the second diffuser housing end 709. The channel 713 in the illustrated embodiment of the diffuser housing 707 is a single channel aligned with each of the light emitting elements 703A, 703B so as to receive light from each light emitting element 703A, 703B at the common, single channel. Though in other embodiments within the scope of the present disclosure, the diffuser housing can define two separate channels—one channel aligned with one of the light emitting elements 703A, 703B and the other channel aligned with the other of the light emitting elements 703A, 703B. The first diffuser housing end 708 can be positioned adjacent the projection lens 704, and the second diffuser housing end 709 can include an opening 714 at the diffuser housing 707.

Figure 8:
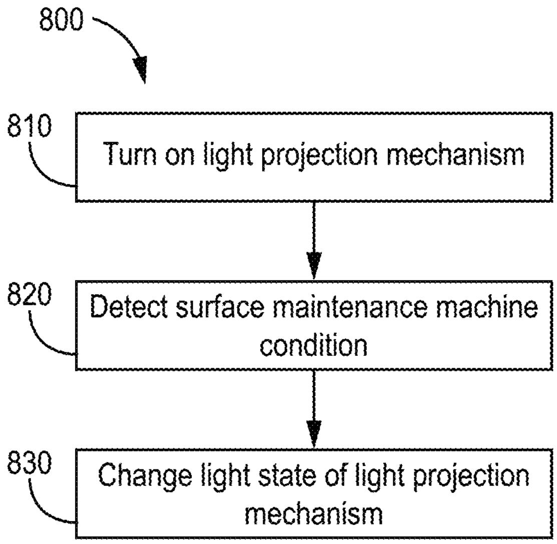
FIG. 8 is a flow diagram of an exemplary embodiment of a method of operating a light projection mechanism.

FIG. 8 is a flow diagram of an exemplary embodiment of a method 800 of operating a light projection mechanism.

At step 810, the method 800 includes enabling a light projection mechanism. This step can include, for example, turning on the light projection mechanism, such as turning on a light emitting element located within a light housing of the light projection mechanism. When the light projection mechanism is enabled at step 810, the light emitting element of the light projection mechanism can emit light energy at a first light state, such as a first color, a first steady state light emission, or a first flashing light state. The first light state can be projected from the light projection mechanism onto a ceiling surface to form a ceiling projected light area. In some cases, the light projection mechanism can be enabled, and in the first light state, at step 810 in response to a control signal from a controller, of a surface maintenance machine, to which the light projection mechanism is coupled. The control signal can be output from the controller to the light projection mechanism as a result of the presence of a first status condition at the surface maintenance machine. As one example, the first autonomously driven mode condition could include the surface maintenance machine being powered and in configured to operate in an autonomously driven mode.

At step 820, the method 800 includes detecting a surface maintenance machine condition. As one example, detecting a surface maintenance machine condition at step 820 can include, for instance, detecting, such as at the surface maintenance machine controller, a change from the first status condition at the surface maintenance machine present at step 810 (e.g., the surface maintenance machine is not operating as programmed initially at the start of a surface maintenance task operation). Such a change from the first status condition at the surface maintenance machine can include, as examples, a warning of an upcoming error state or an indication of the presence of a current error state at the surface maintenance machine. Specific such examples can include low surface maintenance machine fluid level, low surface maintenance machine battery level, and surface maintenance machine mobility deviation from a previously selected course of travel (e.g., the surface maintenance machine is not moving according to its preprogrammed path of travel, for instance, because it is stuck at a location in the operating environment).

At step 830, the method 800 includes changing the light state at the light projection mechanism. Changing the light state at the light projection mechanism at step 830 can include changing the light state at the light projection mechanism in response to detecting the surface maintenance machine condition at step 820. For example, prior to detecting the surface maintenance machine condition at step 820, the light emitting element at the light projection mechanism can be in the first light state as noted at step 810. Then, in response to detecting the surface maintenance machine condition at step 820, the light state at the light projection mechanism can be changed at step 830 to a second light state that is different than the first light state. The second light state can be projected from the light projection mechanism onto the ceiling surface to form the ceiling projected light area. As one particular example, the light projection mechanism can be in the first light state in the form of a first color and/or first light emission pattern (e.g., steady state light emission or flashing light emission) (at step 810), the surface maintenance machine condition, such as noted above the warning of an upcoming error state or an indication of the presence of a current error state at the surface maintenance machine, can be detected (at step 820), and, in response to detecting the surface maintenance machine condition, the light state at the light projection mechanism can be changed from the first light state to a second, different light state in the form of a second, different color and/or second, different light emission pattern (e.g., the other of steady state light emission of flashing light emission).

Various non-limiting exemplary embodiments have been described. It will be appreciated that suitable alternatives are possible without departing from the scope of the examples described herein.

What is claimed is:

1. A surface maintenance machine comprising:

a body;

a surface maintenance tool coupled to the body;

processing circuitry supported at the body; and a light projection mechanism supported at the body and coupled to the processing circuitry, the light projection mechanism including a light housing, a light emitting element within the light housing, and a projection lens that is configured to focus light emanating from the light emitting element, wherein the light projection mechanism is configured to project light onto a ceiling surface that is above a floor surface along which the surface maintenance machine is configured to perform a surface maintenance task using the surface maintenance tool, and wherein the processing circuitry is configured to receive input related to transitioning the surface maintenance machine from a manually driven mode to an autonomously mode and in response to said received input cause the light projection mechanism to transition from a disabled state to an enabled state.

2. The surface maintenance machine of claim 1, wherein the light emitting element has a light intensity, and wherein the projection lens has a light focus, and wherein the light intensity and the light focus are configured such that the light projection mechanism is configured to project light onto the ceiling surface at a distance of at least fifteen feet from the light projection mechanism.

3. The surface maintenance machine of claim 2, wherein the light projection mechanism is configured such that the light projected onto the ceiling surface has a ceiling projected light area that is within an envelope defined by the body of the surface maintenance machine.

4. The surface maintenance machine of claim 3, wherein the body defines a central longitudinal axis, wherein the body includes a maximum body width defined in a first direction perpendicular to the central longitudinal axis, wherein the body includes a maximum body length defined in a second direction parallel to the central longitudinal axis, and wherein the envelope is an area defined by the maximum body width and the maximum body length.

5. The surface maintenance machine of claim 3, wherein the light projection mechanism is configured such that the light projected onto the ceiling surface has the ceiling projected light area of at least thirty-six square inches and no more than 1,296 square inches.

6. The surface maintenance machine of claim 1, wherein the projection lens is positioned between 0.5 inch and 6 inches from the light emitting element.

7. The surface maintenance machine of claim 1, wherein when the surface maintenance machine is configured to operate in the autonomously driven mode the light emitting element is in the enabled state.

8. The surface maintenance machine of claim 7, wherein the light projection mechanism is configured to project light onto the ceiling surface in a first light state when the surface maintenance machine is in a first autonomously driven mode condition, wherein the light projection mechanism is configured to project light onto the ceiling surface in a second light state when the surface maintenance machine is in a second autonomously driven mode condition, and wherein the first autonomously driven mode condition is different than the second autonomously driven mode condition and the first light state is different than the second light state.

9. The surface maintenance machine of claim 8, wherein the first autonomously driven mode condition is selected from the group consisting of: low surface maintenance machine fluid level, low surface maintenance machine battery level, and surface maintenance machine mobility deviation.

10. The surface maintenance machine of claim 9, wherein the first light state is a first color and the second light state is a second, different color.

11. The surface maintenance machine of claim 7, wherein the surface maintenance machine further comprises:

a manual/autonomous mode user input mechanism coupled to the light projection mechanism, and wherein when the manual/autonomous mode user input mechanism is actuated to transition the surface maintenance machine from the manually driven mode to the autonomously driven mode the light projection mechanism is configured to transition from the disabled state to the enabled state.

12. The surface maintenance machine of claim 1, wherein the light projection mechanism further comprises:

a light diffuser positioned to receive light emanating from the light emitting element.

13. The surface maintenance machine of claim 12, wherein the light diffuser includes a diffuser housing, wherein the diffuser housing includes a first diffuser housing end, a second diffuser housing end that is opposite the first diffuser housing end, and one or more side walls extending between the first diffuser housing end and the second diffuser housing end, and wherein the one or more side walls include a translucent material through which light received from the light emitting element at the light diffuser is output radially from the light diffuser housing.

14. The surface maintenance machine of claim 13, wherein the diffuser housing defines a channel extending from the first diffuser housing end to the second diffuser housing end, wherein the first diffuser housing end is positioned adjacent the projection lens, and wherein the second diffuser housing end includes an opening defined in the diffuser housing such that a portion of light received from the light emitting element at the light diffuser passes through the channel and out the opening.

15. The surface maintenance machine of claim 14, wherein the light diffuser housing is configured to output light received from the light emitting element both radially via the translucent material at the one or more side walls and vertically via the channel and the opening.

16. A light projection mechanism comprising:

a light housing;

light projection processing circuitry supported at the light housing, wherein the light projection processing circuitry includes an input that is configured to couple to a surface maintenance machine controller;

a light emitting element within the light housing and coupled to the processing circuitry;

a projection lens supported at the light housing, the projection lens configured to focus light emanating from the light emitting element; and a light diffuser positioned to receive light emanating from the light emitting element, wherein the light diffuser includes a diffuser housing, wherein the diffuser housing includes a first diffuser housing end, a second diffuser housing end that is opposite the first diffuser housing end, a channel extending from the first diffuser housing end to the second diffuser housing end, and one or more side walls extending between the first diffuser housing end and the second diffuser housing end, wherein the one or more side walls include a translucent material through which light received from the light emitting element at the light diffuser is output radially from the light diffuser housing, wherein the first diffuser housing end is positioned adjacent the projection lens, and wherein the second diffuser housing end includes an opening defined in the diffuser housing such that a portion of light received from the light emitting element at the light diffuser passes through the channel and vertically out the opening, wherein the light projection mechanism is configured to project light onto a ceiling surface at a distance of at least fifteen feet from the light projection mechanism.

17. The light projection mechanism of claim 16, wherein the light emitting element has a light intensity, and wherein the projection lens has a light focus, and wherein the light intensity and the light focus are configured such that the light projection mechanism is configured to project light onto the ceiling at the distance of at least fifteen feet from the light projection mechanism.

18. The light projection mechanism of claim 17, wherein the light emitting element is a light emitting diode positioned within the light housing adjacent the projection lens.

19. The light projection mechanism of claim 16, wherein the input of the light projection processing circuitry is configured to receive, from the surface maintenance machine controller, an enable state command corresponding to an autonomously driven mode of the surface maintenance machine, and, in response to receiving the enable state command, the light projection processing circuitry is configured to transition the light emitting element from a disabled state to an enabled state.

20. A surface maintenance machine comprising:

a body;

a surface maintenance tool coupled to the body;

processing circuitry supported at the body; and a light projection mechanism supported at the body and coupled to the processing circuitry, the light projection mechanism including a light housing, a light emitting element within the light housing, a projection lens that is configured to focus light emanating from the light emitting element, and a light diffuser positioned to receive light emanating from the light emitting element, wherein the light projection mechanism is configured to project light onto a ceiling surface that is above a floor surface along which the surface maintenance machine is configured to perform a surface maintenance task using the surface maintenance tool, and wherein the light diffuser includes a diffuser housing, wherein the diffuser housing includes a first diffuser housing end, a second diffuser housing end that is opposite the first diffuser housing end, and one or more side walls extending between the first diffuser housing end and the second diffuser housing end, and wherein the one or more side walls include a translucent material through which light received from the light emitting element at the light diffuser is output radially from the light diffuser housing.

* * * * *